(No Model.)
5 Sheets—Sheet 3.
H. AIKEN.
SHEARS.
No. 584,658. Patented June 15, 1897.
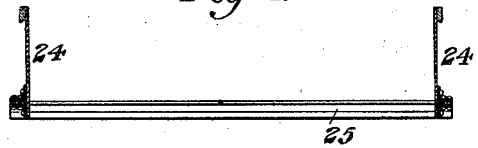
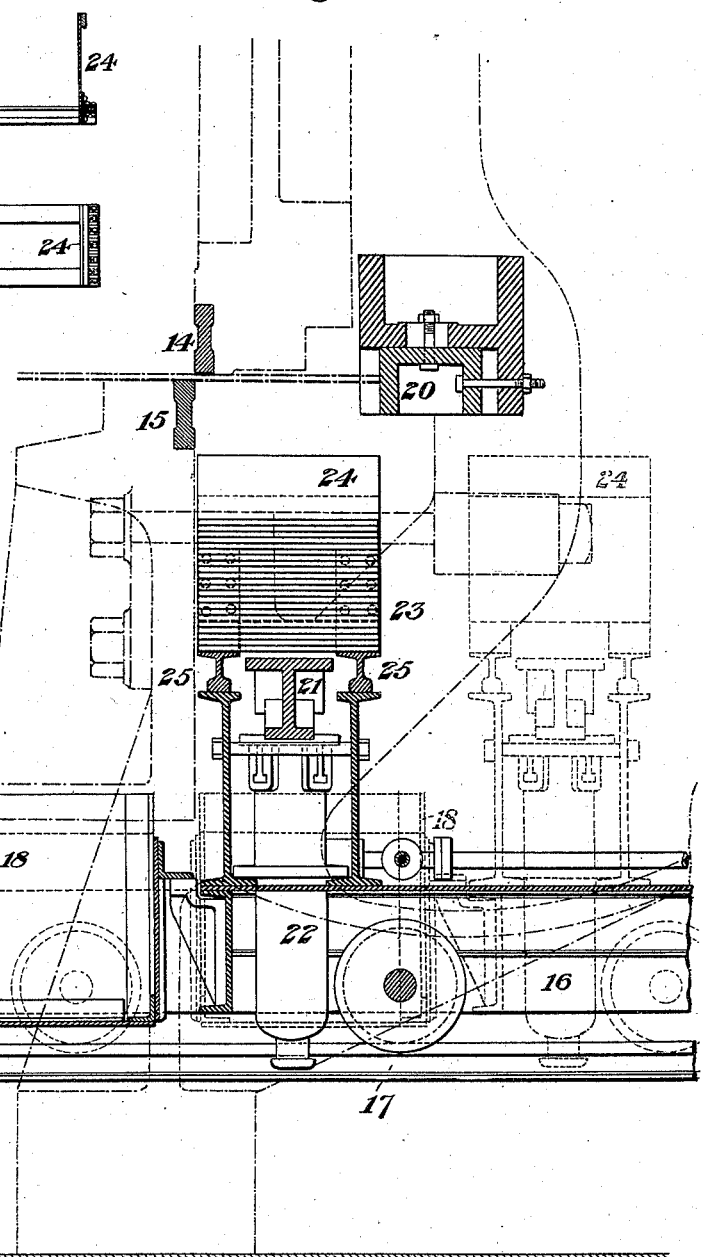
WITNESSES
Thomas W. Bakewell
INVENTOR
Henry Aiken (No Model.)

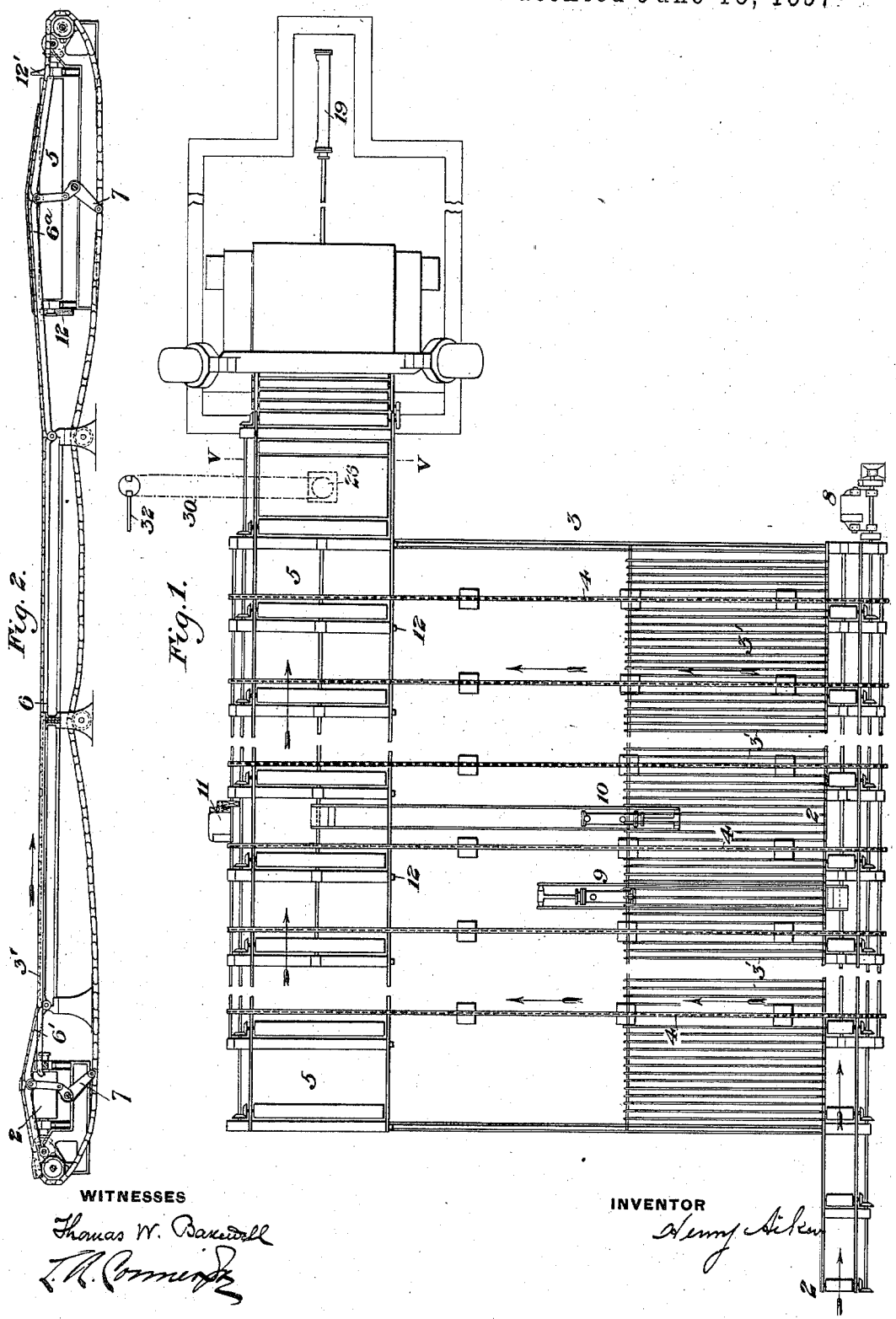

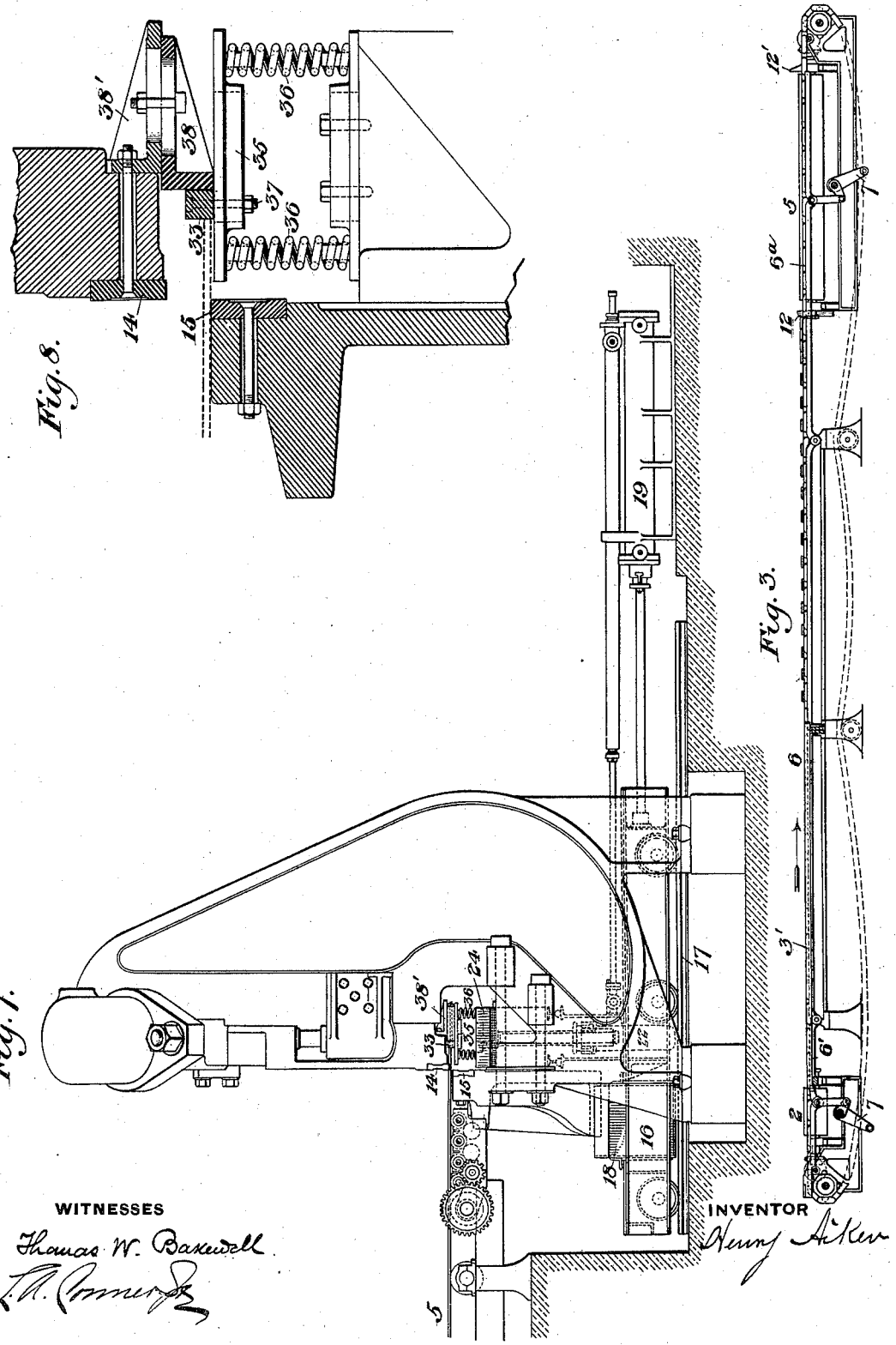

5 Sheets—Sheet 4.

H. AIKEN.
SHEARS.

No. 584,658.    Patented June 15, 1897.

WITNESSES
Thomas W. Bakewell

INVENTOR
Henry Aiken (No Model.)  5 Sheets—Sheet 5.
H. AIKEN.
SHEARS.
No. 584,658.   Patented June 15, 1897.
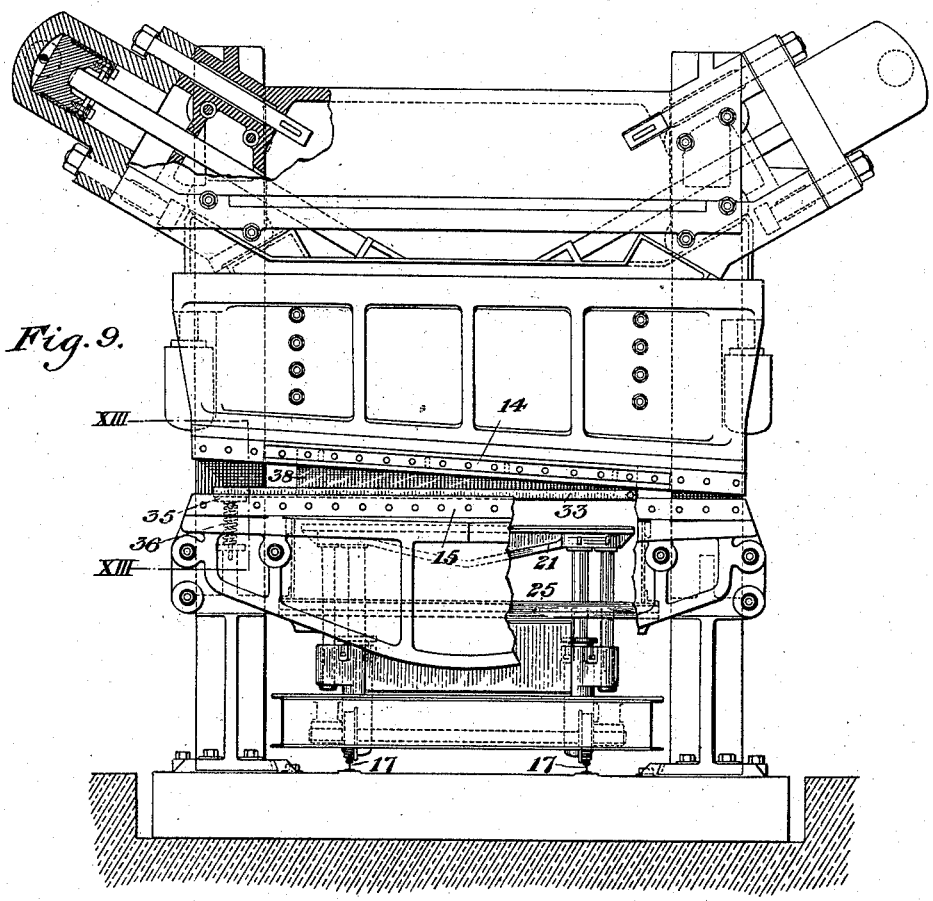
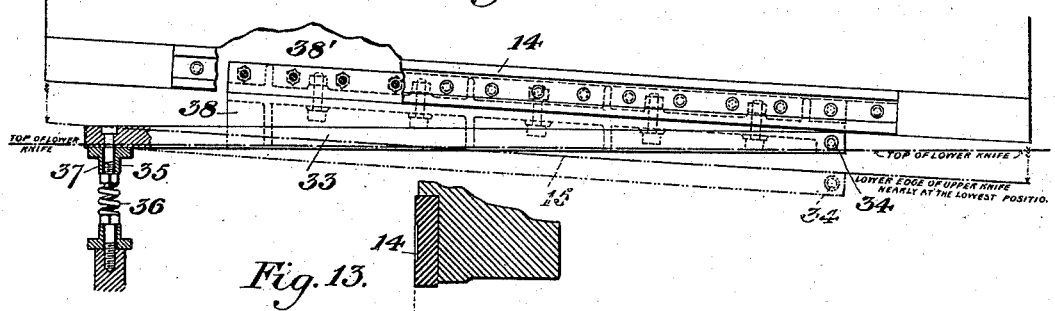
WITNESSES
Thomas W. Bakewell
INVENTOR
Henry Aiken
THE NORRIS PETERS CO., PHOTO-LITHO., WASHINGTON, D. C.

UNITED STATES PATENT OFFICE.

HENRY AIKEN, OF PITTSBURG, PENNSYLVANIA.

SHEARS.

SPECIFICATION forming part of Letters Patent No. 584,658, dated June 15, 1897.

Application filed October 3, 1896. Serial No. 607,726. (No model.)

*To all whom it may concern:*

Be it known that I, HENRY AIKEN, of Pittsburg, in the county of Allegheny and State of Pennsylvania, have invented a new and useful Improvement in Shears, of which the following is a full, clear, and exact description, reference being had to the accompanying drawings, forming part of this specification, in which—

Figure 5:
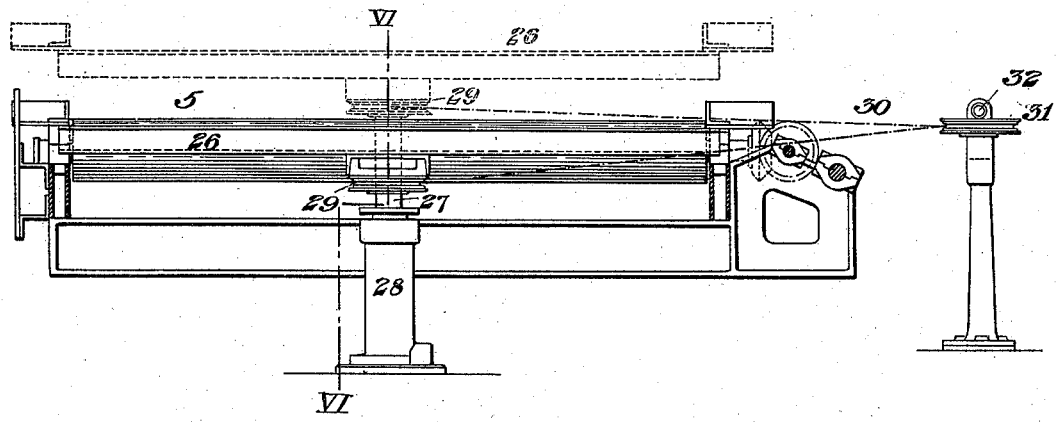
Figure 6:
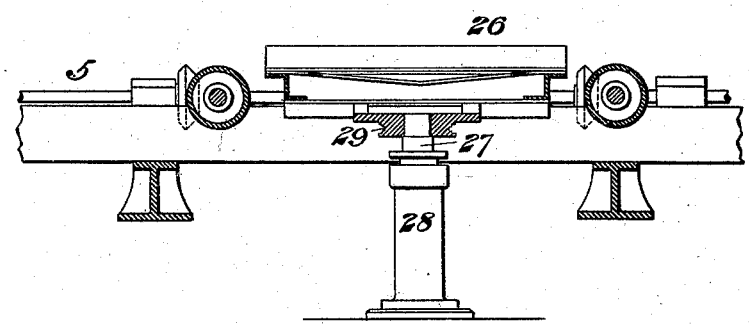

Figure 1 shows a plan view of the shears and the apparatus for conveying the metal thereto. Fig. 2 is an elevation of the conveying mechanism. Fig. 3 is a similar view showing the metal pieces grouped thereon. Fig. 4 is a view on a larger scale, showing in vertical section the shears and the devices for receiving the sheared metal and scrap. Fig. 5 is a cross-sectional view on the line V V of Fig. 1, but on a larger scale. Fig. 6 is a section on the line VI VI of Fig. 5. Fig. 7 is a side elevation of the shears, showing a modified construction of stop for gaging the length of the piece to be cut. The purpose of the modification is to enable the cutting of pieces of short length. Fig. 8 is a detail sectional view illustrating said modification. Fig. 9 is a front elevation of the shears shown in Fig. 8, and Fig. 10 is an enlarged front elevation of the knives and the stop or gage. Figs. 11 and 12 are detail views of the crate or frame on which the cut metal pieces are stacked. Fig. 13 is a section on the line XIII XIII of Fig. 9.

The apparatus shown in the accompanying drawings is especially designed for handling and shearing flat bars of metal, such as are used in the manufacture of tin-plate, and to better illustrate the nature of the apparatus I will explain that I can take such bars in the form of strips, say, seventy feet long and from six to eight inches wide, group them in the shears in groups of, say, twenty pieces lying side by side, cut all these pieces at one descent of the knife, and then alternately feed them forward and cut them into pieces of, say, twenty and one-fourth inches in length. After the cutting has progressed nearly to the end of the length of the grouped bars they are turned and a crop cut from them, so as to leave the remainder of the bars of a length which is a multiple of the length of the sections into which the bars are being divided, and then the cutting is continued, so that at the last cut there shall be sufficient metal at both sides of the shear-blades to balance and insure its proper handling. The apparatus also affords facility for stacking and conveniently manipulating the sheared product and for receiving the crop ends in a convenient receptacle or box.

The foregoing explanation is not intended to limit the application of my improvement to the cutting of short pieces of metal, since many of the parts of the invention separately claimed are capable of use independently and in other combinations.

Referring now to Figs. 1, 2, and 3, 2 represents a conveying-table of driven feed-rollers, by which the bars of metal to be sheared are conveyed from the rolls of a rolling-mill. At the end of the conveying-table is a cooling-table 3, composed, preferably, of a series of endless chains 4, extending transversely from the conveying-table 2 to the feed-table 5 of the shears, which feed-table comprises, preferably, a series of driven rollers. The upper branches of these chains are supported by horizontal bars 6, and each of the sections 6' and 6ª of said bars, which extend across the tables 2 and 5, is jointed and is movable vertically by suitable levers or other mechanism 7, so that after the metal bars have been carried by the rollers of the table 2 into position above the chains the chains may be raised so as to lift the bars from the rollers and to permit them to be carried forward on the cooling-bed, and similarly that when the bars have been conveyed by the chains into position above the rollers of the table 5 they may be lowered so as to be deposited upon said rollers and carried forward thereby to the shears. Between the chains of the table 3, next to the conveying-table 2 and at the same level as the chains, I prefer to place a series of bars or gratings 3', which assist in supporting the metal pieces and prevent them from sagging and bending when they are hot and soft.

8 is a motor for driving the rollers of the table 2, and a similar motor may be employed for the table 5.

9 is a motor for operating the levers, which raise and lower the jointed supporting-bars 6' of the endless chains.

10 is a like motor connected with and adapted to operate the supporting-bars 6ª, and 11 is a motor for the endless chains 4.

In operating the parts of the apparatus above described the metal bars to be sheared are carried successively from the rolls by the table 2 into position above the chains of the cooling-table. As each bar arrives at the end of the table 2 said chains are lifted by elevating the jointed bars 6', and by operation of the motor 11 the bars then on the chains are carried forward a short distance. This operation is repeated until a series of, say, twenty bars lie side by side upon the chains in parallel position separated laterally, say, about twelve inches apart, so that they may have facility for cooling, and thereupon the chains are moved so as to carry all of these bars together toward the end of the cooling-table 3 next to the conveying-table, where, by engagement of the first bar of the group with a series of projecting stops 12, all of the bars are collected on the chains side by side in lateral contact with each other, the gaps above mentioned, which were left between them to facilitate cooling, being closed up by continuing the motion of the chains after the first bar has engaged the stops. When the bars have thus been closely grouped together upon the chains, the sections 6ª are raised, as shown in Fig. 2, so as to lift the surfaces of the chains carried thereby to a level above the stops 12 and the surfaces of the rollers of the table 5, and by again moving the chains the entire group is carried into position above said table, upon which they are finally deposited by lowering the jointed sections 6ª. Instead of thus raising the metal bars above the stops the stops may be arranged to be lowered out of the path of the bars. When the pieces are carried over the shear-table, their motion is checked by stop projections 12' at the outer margin of the table, which stop the metal in proper position to be carried directly to the shears. The bars are then carried to the shears by rotation of the rollers of the table 5 until their forward ends pass beyond the line of the shear-blades 14 15, Fig. 4. At that time a buggy 16 (which runs upon a track 17 and carries a scrap-box 18 and a metal-receiving crate, hereinafter to be described, and is movable longitudinally upon its track by a cylinder 19) is brought into such position that the scrap-box is directly below the shear-blades, as shown by dotted lines in Fig. 4, and when the moving blade descends it cuts off from the bars the crop ends, which drop into and are retained by the scrap-box. The buggy 16 is then moved so as to bring the crate below the shear-blades, the moving knife is raised, and the group of metal bars is again advanced until their ends engage and are stopped by a stop or gage 20. When the knife again descends, pieces of equal length are cut from the bars, and these pieces as cut are received upon a support 21 at the upper end of the plunger of a cylinder or other motor 22 on the buggy 16, which support extends up through the bottom of a crate or frame 23 and is elevated to the level of the shear-blades. The crate has end pieces or plates 24 and bottom plates or rails 25, between which the support 21 may move. The operation of advancing and cutting the group of bars is repeated, as above described, and at each cut the support 21 is lowered a little, so that the cut pieces are deposited in parallel and regular position, layer upon layer. When a sufficient number of pieces have been cut to constitute a load for the crate, the support 21 is lowered, as shown in Fig. 4, below the bottom of the crate, so as to deposit the bars upon the crate-rails 25, and then the buggy 16 may be withdrawn and the crate, with its burden, lifted as a whole and carried to the car or other place upon which the metal is to be loaded or to another department of the mill where the metal is to be used. In loading the metal upon cars the crate is lowered upon the bottom of the car and then tipped laterally, thus depositing the metal pieces upon their edge in convenient form for shipment. I am the first to provide means for presenting alternately to the shears a scrap-box for the crop ends and a crate or receptacle for the sheared metal pieces, and intend to claim the same broadly, whether they be arranged as shown in the drawings or whether the scrap-box be stationary below the shears and the metal-receptacle be moved back and forth into position above it.

When the cutting of a group of bars has been continued nearly to the rear end of the bars in order to provide that at the last cut there shall be enough of the metal bars in front of the shears to balance the weight of the bars between the shears and the stop 20, I employ mechanism by which before the last cut is reached I turn the bars endwise on the shear-table, so as to bring their uncut rear ends toward the shears. Then I advance the bars so as to leave in front of the shears a length of the metal bars which is a multiple of the length of the cut pieces—i. e., a multiple of the distance between the shear-blades and the stop 20. The uncut crop ends then projecting between the blades are cut off and received in the scrap-box, which has been brought into proper position to catch them, and then the cutting is proceeded with to the end and the cut pieces stacked upon the crate, as above described. The mechanism which I employ to turn the bars on the feed-table is illustrated in Figs. 1, 5, and 6. It consists of a table or frame 26, which is preferably the same width as the table 5, and is supported between two of the rollers thereof by the plunger 27 of a hydraulic cylinder 28. The plunger 27 can rotate within the cylinder 28, and to the head of the plunger is fixed a pulley-wheel 29, connected by a belt 30 to a pulley 31, adapted to be rotated by a hand-lever 32. When it is desired to turn the bars for the purpose above explained, the table 26 is raised by operation of the cylinder 28, so as to lift the bars above the level of the feed-rollers, and then by the hand-lever the table carrying the bars is rotated on the vertical axis of the plunger 27. Other mechanical appliances for performing this work may be employed.

Where the shears are to be used for cutting the metal bars into pieces of very short length, shorter than the thickness of the moving knife-head, the form of stop shown in Fig. 4 is not proper, for if it be set close enough to the blades to gage the metal it will interfere with the action of the head. I have therefore devised the form of stop shown in Figs. 7, 8, 9, and 10, and will now describe the same. As shown in Fig. 8, the edge of the upper blade 14 is inclined in the usual way and the edge of the lower blade 15 is horizontal. The stop-bar 33 is pivoted at one end 34 to a bracket 38, which extends along and is fixed to the moving knife-head, and at the other end it is connected to a vertically-yielding support 35, which is supported by springs 36, set on a convenient part of the shear-frame. The bolt 37, which connects the stop-bar to the support 35, is adjustable horizontally toward and from the shear-blades by being set in a slot in said support or otherwise, and the bracket 38 is likewise adjustably connected to a bracket 38' on the knife-head, so that by adjustment of these parts the distance of the stop-bar from the shear-blades and the consequent length of the cut can be regulated. The bracket 38 does not extend up to the yielding support 35.

In use of the shears the bars to be cut are fed forward until they engage the stop-bar, as shown by dotted lines in Fig. 8. When the moving knife descends, the part of the knife to the right of the shears, as shown in Figs. 9 and 10, first engages the metal, and that end of the stop-bar (the pivoted end) descends with the knife, while the other end of the bar (the yieldingly-supported end) remains substantially stationary until the highest portion (shown in the drawings at the left) engages the metal, at which time the moving knife-head engages the yieldingly-supported end of the stop-bar and carries it down until the metal is completely severed. By reason of the construction above described the metal during the cutting operation does not scrape against the surface of the stop-bar as it would were the stop-bar fixed rigidly to the knife-head, in which case the severe abrasion would cut and destroy the stop-bar.

I believe I am the first to devise means adapted to group a number of metal bars side by side and to deliver them when thus grouped upon a shear-table.

Within the scope of my invention as defined in the claims the apparatus may be modified in many ways in respect to the construction and arrangement of the parts, since

What I claim is—

1. The combination of a shear-table, conveying mechanism by which the metal pieces are carried laterally, and a stop adapted to check the pieces in their lateral movement, and to group and assemble them.

2. The combination of a shear-table, and means for assembling and conveying to the shear-table a group of metal pieces; substantially as described.

3. The combination with the shear-table, of a conveying-table adapted to carry metal pieces from a mill, a conveyer which receives them and carries them laterally to the shear-table, and means by which the metal bars so carried are grouped; substantially as described.

4. Shearing apparatus comprising a conveyer for carrying singly the metal pieces to be sheared, a second conveyer leading transversely therefrom and adapted to group the metal pieces together, and means for conveying the grouped metal pieces to the shears; substantially as described.

5. Shearing apparatus comprising a shear-table, a conveying-table leading thereto, a stop by which the metal pieces are stopped and grouped, and means for carrying the metal pieces past the stop; substantially as described.

6. The combination of the tables 2 and 5, a conveying-table extending transversely between them and comprising endless chains by which the metal pieces are carried, stops for the table, and vertically-movable supports for the chains by which the chains can be moved above and below the level of the tables; substantially as described.

7. The combination of the tables 2 and 5, a conveying-table extending transversely between them and comprising endless chains by which the metal pieces are carried, stops for the table, vertically-movable supports for the chains by which the chains can be moved above and below the level of the tables, and stop projections also on the table 5, substantially as described.

8. The combination of the shear-table, a turn-table extending across the entire width of the table, and adapted to turn a group of metal pieces; substantially as described.

9. The combination with shears, of a scrap-box, a buggy by which it is carried, and means for moving said buggy back and forth into and out of position to receive the crop ends in the scrap-box; substantially as described.

10. Shears having a scrap-box, and a receptacle for the sheared metal, and means for presenting the same alternately to the shears; substantially as described.

11. The combination with shears, of a scrap-box, a metal-receptacle, a buggy carrying both of them, and means for alternately presenting the scrap-box and metal-receptacle to the shears; substantially as described.

12. The combination with the shears, of a support adapted to receive the sheared metal, and means for lowering it as the sheared metal is deposited thereon; substantially as described.

13. The combination with the shears, of a support adapted to receive the sheared metal, means for lowering it as the sheared metal is deposited thereon, and a crate within which the support moves; substantially as described.

14. The combination of shears, having a moving blade, and a stop moving with the said blade and set nearer to the cutting edges than the thickness of the moving knife-head; substantially as described.

15. The combination of shears, having blades arranged at an angle, and a stop connected to the moving shear-head at the one end only; substantially as described.

16. The combination of shears, having blades arranged at an angle, and a stop connected to the moving shear-head at the one end and yieldingly supported at the other end; substantially as described.

17. The combination of shears, having blades arranged at an angle, a stop connected to the moving shear-head at the one end and yieldingly supported at the other end, said stop being adjustable to and from the knife-blades; substantially as described.

In testimony whereof I have hereunto set my hand.

HENRY AIKEN.

Witnesses:
THOMAS W. BAKEWELL,
G. I. HOLDSHIP.